(12) United States Patent
Schmitt et al.

(10) Patent No.: US 11,604,768 B2
(45) Date of Patent: Mar. 14, 2023

(54) OPTIMIZING RESOURCES IN A DISASTER RECOVERY CLEANUP PROCESS

(71) Applicant: International Business Machines Corporation, Armonk, NY (US)

(72) Inventors: Christof Schmitt, Tucson, AZ (US); Sharathchandra Pankanti, Fairfield County, CT (US); Tomas Krojzl, Brno (CZ); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/361,800

(22) Filed: Jun. 29, 2021

(65) Prior Publication Data
US 2022/0414063 A1 Dec. 29, 2022

(51) Int. Cl.
*G06F 16/00* (2019.01)
*G06F 16/174* (2019.01)
*G06F 11/14* (2006.01)

(52) U.S. Cl.
CPC ...... *G06F 16/1748* (2019.01); *G06F 11/1453* (2013.01)

(58) Field of Classification Search
CPC .......................... G06F 16/1748; G06F 11/1453
See application file for complete search history.

(56) References Cited

U.S. PATENT DOCUMENTS

| 10,776,394 | B2* | 9/2020 | Krojzl | G06F 11/2094 |
| 10,802,868 | B1 | 10/2020 | Schmitt | |
| 2016/0239396 | A1 | 8/2016 | Deng | |
| 2019/0095293 | A1 | 3/2019 | Zhang | |
| 2019/0370379 | A1* | 12/2019 | Krojzl | G06F 16/275 |
| 2019/0370380 | A1* | 12/2019 | Krojzl | G06F 11/2097 |
| 2020/0159609 | A1 | 5/2020 | Korotaev | |

* cited by examiner

*Primary Examiner* — Tyler J Torgrimson
(74) *Attorney, Agent, or Firm* — Edward J. Wixted, III (57) ABSTRACT

In an approach for optimizing resources in a disaster recovery cleanup process, processors are configured for receiving transaction entries represented by transaction identifiers at a source database in communication with target databases via Synchronous-to-Asynchronous Traffic Converters (SATCs). Further, the processors are configured for transmitting a transaction payload from the SATCs to the target databases; identifying completed tracking entries corresponding to tracking entries having a complete status for the SATCs; deleting remaining transaction entries ranging from a transaction entry associated with a highest processed transaction identifier to a transaction entry associated with a lowest processed transaction identifier; providing a list of the remaining transaction entries that were deleted to predecessors of the SATCs; removing the remaining transaction entries from the SATCs if the transaction entries were delivered to all target databases; and detecting a topology change corresponding to one or more additional SATCs integrated with the one or more SATCs.

20 Claims, 7 Drawing Sheets

OPTIMIZING RESOURCES IN A DISASTER RECOVERY CLEANUP PROCESS

BACKGROUND

The present invention relates generally to the field of data recovery, and more particularly to optimizing resources in a disaster recovery cleanup process for data traffic management.

Today, all Disaster Recovery (DR) traffic is configured on a component level (e.g., server-to-server). Options to control DR traffic on a Data Center level are very limited or completely missing. Traditional database DR is designed as direct source to target database replication where a customer will decide a target location (e.g., server in a given data center). This target location is static and does not change over time. These traditional databases are typically tied to other services (e.g., applications using the database, other related databases) that need to be co-located close together (e.g., in the same data center or even same data room) to ensure low latency connectivity between these components. Co-located services in a database may be referred to as "failover group".

Customers of such co-located services may have requirements for the data not leaving the country, geography, or political area (e.g., European Union, US West Coast), wherein the requirements may be driven by legal compliance factors, performance factors, or other factors. A group of valid target locations for a given failover group can be called "failover area" (e.g., set of locations meeting customer requirements). Customers are expecting certain Service Level Agreement (SLA) targets when it comes to failover groups or failover areas, in particular Recovery Time Objective (RTO) and Recovery Point Objective (RPO).

In the case of asynchronous replication, RPO is greater than 0 and is driven by used technology and network utilization between data centers, wherein higher latency or network contention will cause increased RPO. In the case of synchronous replication, the source database performance will be impacted by higher latency or network contention.

SUMMARY

Embodiments described herein provide solutions to provide a computer-implemented method for optimizing resources in a disaster recovery cleanup process within a traffic management framework.

Aspects of the present invention disclose a computer-implemented method, computer program product and a computer system for optimizing resources in a disaster recovery cleanup process. In an embodiment, the computer-implemented method may include one or more processors configured for receiving transaction entries represented by transaction identifiers at a source database (DB) in communication with one or more target databases via one or more Synchronous-to-Asynchronous Traffic Converters (SATCs) defining a first topology; transmitting a transaction payload from the one or more SATCs to the one or more target databases. In an embodiment, the transaction payload is associated with a first set of tracking entries selected to be processed based on a first set of Quality of Service (QoS) parameters.

Several aspects of the present invention may further include one or more processors configured for generating a tracking entry having a status identifier for each of the one or more transaction entries and marking the status identifier for each tracking entry associated with the remaining transaction entries that were deleted as a deleted status.

Several aspects of the present invention may further include one or more processors configured for replicating the tracking entry in the one or more SATCs when the one or more SATCs has more than one successor SATCs.

Several aspects of the present invention may further include one or more processors configured for identifying completed tracking entries corresponding to tracking entries having a complete status for the one or more SATCs.

Several aspects of the present invention may further include one or more processors configured for deleting remaining transaction entries ranging from the transaction entry associated with a highest processed transaction identifier to a transaction entry associated with a lowest processed transaction identifier.

Several aspects of the present invention may further include one or more processors configured for providing a list of the remaining transaction entries from the one or more SATCs if the transaction entries were delivered to each of the one or more target databases.

Several aspects of the present invention may further include one or more processors configured for identifying a first consistency transaction entry as one or more of the remaining transaction entries that were not delivered to each of the one or more target databases and delivering the first consistency transaction entry to a first target database deficient of the first consistency transaction entry.

Several aspects of the present invention may further include one or more processors configured for detecting a topology change corresponding to one or more additional SATCs integrated with the one or more SATCs defining a second topology; generating new tracking entries having new status identifiers for each of the one or more transaction entries affected by the topology change in the second topology; identifying second consistency transaction entries as one or more of the one or more transaction entries that were not delivered to the one or more target databases; and delivering the second consistency tracking entries to a second target database deficient of the second consistency tracking entries.

DETAILED DESCRIPTION

Embodiments of the present invention describe a database DR traffic management innovation that provides an option to consolidate DR traffic by using "DR converters" (e.g., Synchronous-to-Asynchronous Traffic Converter "SATC") and to work with such consolidated traffic stream. An SATC may be a node in a network configured to receive, transmit, and/or communicate data to other nodes within the network.

An existing replication process stores information permanently to ensure that in case of a topology change, the information can be re-sent to avoid informational data loss. Once the information arrives at the dependent target systems, there is no need to keep storing the data and data can be deleted to reduce disk space requirements. The cleanup process describes the approach of how to select which information or data can be safely deleted and which information is still required to prevent data loss. Further, the cleanup process is also configured to account for a topology change within the network environment.

In an embodiment, DR traffic management may include a networking environment wherein a target database location does not need to be static, rather the location can change over time depending on agreed Service Level Agreements (SLAs) and real network utilization. There may be an assumption that there is a technical (database specific) way to switch a target location, wherein the operation to perform the switch may include the following steps: (1) create a new target database in a new location; (2) switch replication from existing target database in existing location to a new target database in a new location; and (3) delete old target database in old location. Embodiments of the present invention provide a method for optimizing the overall process by selecting optimal target locations from failover areas for every failover group takes into consideration SLA targets (e.g., maximum latency) and existing network utilization (e.g., existing and bandwidth utilization versus bandwidth capacity).

In an embodiment, a first step of the replication process may include one or more processors configured to ship database log updates from source database to a first component (e.g., SATC 1) of a Successor System (e.g., environment components down the line in the network environment). In the case of synchronous replication, the source database may be configured to wait for each transaction confirmation from the Successor System that the log update was persisted. For each received Transaction identifier (ID), SATC 1 may be configured to create a Tracking Entry against its Successor System and status mark them as "new". In the case that replication to a component (e.g., source database) in a Predecessor System (e.g., environment components up the line in the network environment is synchronous), two situations could happen: (1) replication to Successor System is asynchronous (e.g., SATC 1 sends confirmation to Source Database that information was persisted), or (2) replication to Successor System is synchronous (e.g., SATC 1 waits for each Tracking Entry related to this Successor System to be status marked as "processed") and only then SATC 1 may be configured to send confirmation to the Source Database that information was persisted.

In an embodiment, a second step of the replication process may include one or more processors configured for the first component SATC 1 to select a set of Tracking Entries that were status marked as "new" to process based on Quality of Service (QoS) parameters. For example, SATC 1 may be configured to ship or transmit a transaction payload associated with selected Tracking Entries to a second component (e.g., SATC 2) in Successor System. In case of synchronous replication, SATC 1 may be configured to wait for each transaction for confirmation from SATC 2 that the transaction payload was persisted. In the case that replication to Predecessor System (i.e., Source Database) is synchronous, two situations could happen: (1) replication to Successor System is asynchronous (e.g., SATC 1 sends confirmation to Source Database that information was persisted), or (2) replication to Successor System is synchronous (e.g., SATC 1 waits for each Tracking Entry related to this Successor System to be status marked as "processed"), and only then SATC 1 sends confirmation to Source Database that information was persisted.

In an embodiment, for each received Transaction ID, SATC 2 may be configured to create Tracking Entry against each Successor System related to a third component (e.g., SATC 3) and tracking entries related to a fourth component (e.g., SATC 4) and will status mark them as "new". In case that replication to Predecessor System (e.g., SATC 1) is synchronous, two situations could happen: (1) replication to Successor System is asynchronous (e.g., SATC 2 sends confirmation to SATC 1 that information was persisted), or (2) replication to Successor System is synchronous (e.g., SATC 2 waits for each Tracking Entry related to this Successor System to be marked as "processed"), and only then SATC 2 sends confirmation to SATC 1 that information was persisted.

In an embodiment, a third step of the replication process may include one or more processors configured for the second component SATC 2 to select a set of Tracking Entries to process that were status marked as "new" based on QoS parameters. For example, SATC 2 may be configured to ship or transmit a transaction payload associated with selected Tracking Entries to a third component (e.g., SATC 3) in Successor System. In the case of synchronous replication, SATC 2 may be configured to wait for each transaction for confirmation from SATC 3 that the transaction payload was persisted. For each received Transaction ID, SATC 3 may be configured to create a Tracking Entry against each Successor System and status mark them as "new". In case that replication to Predecessor System (i.e., SATC 2) is synchronous, two situations could happen: (1) replication to Successor System is asynchronous (e.g., SATC 3 sends confirmation to SATC 2 that information was persisted), or (2) replication to Successor System is synchronous (e.g., SATC 3 waits for each Tracking Entry related to this Successor System to be status marked as "processed"), and only then SATC 3 sends confirmation to SATC 2 that information was persisted.

In an embodiment, a fourth step of the replication process may include one or more processors configured for the second component SATC 2 to select a set of Tracking Entries to process that were status marked as "new" based on QoS parameters. For example, SATC 2 may be configured to ship or transmit a transaction payload associated with selected Tracking Entries to a fourth component (e.g., SATC 4) in Successor System. In the case of synchronous replication, SATC 2 may be configured to wait for each transaction for confirmation from SATC 4 that the transaction payload was persisted. For each received Transaction ID, SATC 4 may be configured to create a Tracking Entry against each Successor System and status mark them as "new". In the case that replication to Predecessor System (i.e., SATC 2) is synchronous, two situations could happen: (1) replication to Successor System is asynchronous (e.g., SATC 4 sends confirmation to SATC 2 that information was persisted), or (2) replication to Successor System is synchronous (e.g., SATC 4 waits for each Tracking Entry related to this Successor System to be status marked as "processed"), and only then SATC 4 sends confirmation to SATC 2 that information was persisted.

In an embodiment, a fifth step of the replication process may include one or more processors configured for the third component SATC 3 to select a set of Tracking Entries to process that were marked as "new" based on QoS parameters. For example, SATC 3 may be configured to ship transaction payload associated with selected Tracking Entries to Successor System (e.g., Target Database 1). In case of synchronous replication, SATC 3 may be configured to wait for each transaction for confirmation from a first Target Database 1 that the transaction payload was persisted. Further, Target Database 1 may be configured to persist the information by replication to Predecessor System (e.g., SATC 3). In the case that replication to Predecessor System (e.g., SATC 3) is synchronous, Target Database 1 may be configured to send confirmation to SATC 3 that the information was persisted.

In an embodiment, a sixth step of the replication process may include one or more processors configured for the fourth component SATC 4 to select a set of Tracking Entries to process that were marked as "new" based on QoS parameters. For example, SATC 4 may be configured to ship transaction payload associated with selected Tracking Entries to Successor System (e.g., Target Database 2). In the case of synchronous replication, SATC 4 may be configured to wait for each transaction for confirmation from a second Target Database 2 that the transaction payload was persisted. Further, Target Database 2 may be configured to persist the information by replication to Predecessor System (e.g., SATC 4). In the case that replication to Predecessor System (e.g., SATC 4) is synchronous, Target Database 1 may be configured to send confirmation to SATC 4 that the information was persisted.

In an embodiment, priority process recovery on SATC components may include two parts: a first part including steps to perform database recovery and a second part to send received transactions to the Successor System successfully.

In an embodiment, a first step in the priority process recovery on SATC components may include one or more processors configured to begin database recovery, wherein a request is initiated to fetch all "in-flight" data to ensure zero data loss. For example, Target Database 1 may be configured to connect to its Predecessor System (e.g., SATC 3) and initiate local Priority Process, wherein the Minimal Transaction ID is the highest processed Transaction ID. The Maximum Transaction ID may not be provided as all transactions that are "in-flight" are needed to make that determination.

In an embodiment, a second step in the priority process recovery on SATC components may include one or more processors configured for SATC 3 to send all persisted transactions with Transaction ID higher than the provided Minimum Transaction ID. Since no Maximum Transaction ID was provided, SATC 3 may connect to its Predecessor System (e.g., SATC 2) and will initiate local Priority Process. Minimal Transaction ID is the highest processed Transaction ID and Maximum Transaction ID may not be provided as all transactions that are "in-flight" are needed to make that determination.

In an embodiment, a third step in the priority process recovery on SATC components may include one or more processors configured for SATC 2 to send all persisted transactions with Transaction ID higher than the provided Minimum Transaction ID. Since no Maximum Transaction ID was provided, SATC 2 may connect to its Predecessor System (e.g., SATC 1) and will initiate local Priority Process. Minimal Transaction ID is the highest processed Transaction ID and Maximum Transaction ID may not be provided as all transactions that are "in-flight" are needed to make that determination.

In an embodiment, a fourth step in the priority process recovery on SATC components may include one or more processors configured for SATC 1 to send all persisted transactions with Transaction ID higher than the provided Minimum Transaction ID. In an embodiment, a Topology Manager may provide information that Predecessor System is Source Database, therefore, Priority Process reached the first SATC and Maximum Transaction ID can be determined. Maximum locally stored Transaction ID may be returned back to the caller (e.g., SATC 2) as Maximum Transaction ID to recover. An optional modification of this process is that SATC 1 may be configured to determine if Source Database is supporting Priority Process, and if yes, it may initiate Priority Process on Source Database.

In an embodiment, a second part for priority process recovery on SATC components may include a fifth step to immediately send all completed and received transactions to the Successor System, which may include the next SATC (e.g., SATC 3) on route to given Target Database. Further, one or more processors may be configured to determine the Maximum Transaction ID and return the Maximum Transaction ID to the caller (e.g., SATC 3) of the Priority Process.

In an embodiment, a second part for priority process recovery on SATC components may include a sixth step for the Priority Process on SATC 2 to complete all received transactions and immediately send the completed received transactions to the Successor System (e.g., Target Database 1). Further, one or more processors may be configured to determine the Maximum Transaction ID and return the Maximum Transaction ID to the caller (e.g., Target Database 1) of the Priority Process.

In an embodiment, a seventh step may include one or more processors configured to initiate the database recovery process once the Priority Process on SATC 3 is complete, signifying that all transactions were successfully received.

The present invention will now be described in detail with reference to the Figures.

Figure 1:
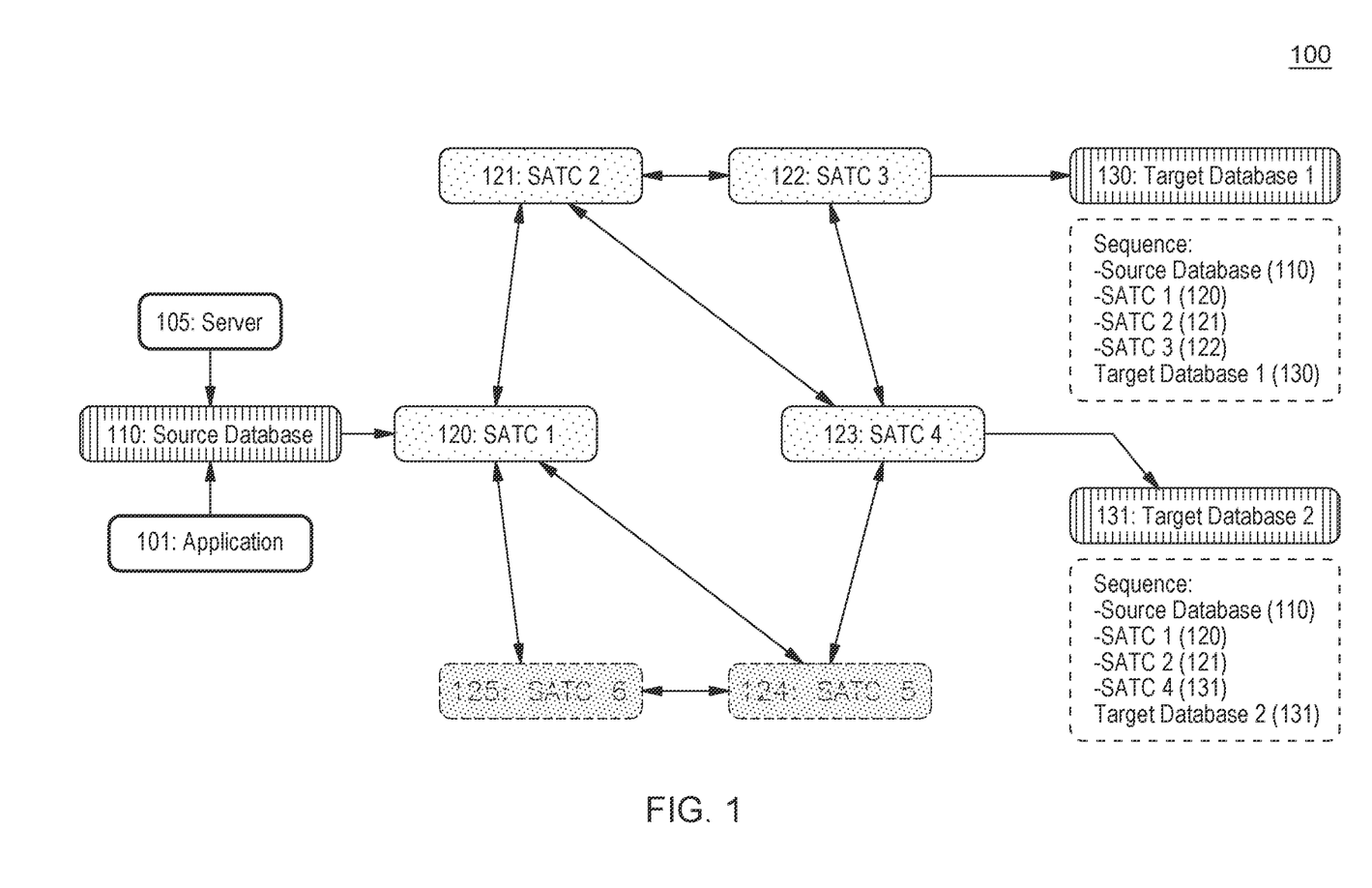
FIG. 1 depicts a component interaction environment for optimizing resources in a disaster recovery cleanup process, in accordance with an embodiment of the present invention.

FIG. 1 depicts a component interaction environment 100 for optimizing resources in a disaster recovery cleanup process, in accordance with an embodiment of the present invention. FIG. 1 provides only an illustration of one embodiment of the present invention and does not imply any limitations with regard to the environments in which different embodiments may be implemented.

In an embodiment, environment 100 may be an SATC network and may include application 101 configured to write data to source database 110 that is synchronously replicating data to local SATC 1 120. SATC 1 120 is then asynchronously replicating data following prescribed routes towards target databases (i.e., target database 1 130, target database 2 131). In an embodiment, target database 1 130 may be configured to receive data from SATC 1 120 through SATC 2 121 and SATC 3 122. In an embodiment, target database 2 131 may be configured to receive data from SATC 1 120 through SATC 2 121 and SATC 4 123. Further, environment 100 may also include SATC 5 124 and SATC 6 125 as part of the SATC network, but SATC 5 124 and SATC 6 125 are not used for data replication initiating from source database 110 and are therefore "grayed out" for this embodiment. SATC network can be simultaneously used for replication of many databases connected to various SATC nodes. Although not displayed, additional replication process may be implemented within environment 100.

Databases (e.g., source database 110, target database 130 and target database 131) may operate as repositories for data associated with environment 100 components (e.g., application 101, SATC 1 120, SATC 2 121, SATC 3 122, SATC 4 123, SATC 5 124, SATC 6 125), and other data transmitted within environment 100. A database is an organized collection of data. Databases can be implemented with any type of storage device capable of storing data and configuration files that can be accessed and utilized by either of environment 100 components, such as a database server, a hard disk drive, or a flash memory. In an embodiment, databases may be accessed by environment 100 components to store data associated with environment 100 components. In an embodiment, the databases may reside independent of environment 100. In another embodiment, the databases may reside elsewhere within environment 100 provided the databases have access to environment 100.

In the depicted embodiment, server(s) 105 may contain a program (e.g., software configured to execute the steps of the invention described herein) and the databases. In some embodiments, server(s) 105 can be a standalone computing device(s), a management server(s), a web server(s), a mobile computing device(s), or any other electronic device(s) or computing system(s) capable of receiving, sending, and processing data. In some embodiments, server 105 may be a laptop computer, tablet computer, netbook computer, personal computer (PC), a desktop computer, a smart phone, or any programmable electronic device capable of communicating environment 100 components. In other embodiments, server(s) 105 represents a server computing system utilizing multiple computers as a server system, such as a cloud computing environment. In yet other embodiments, server (s) 105 represents a computing system utilizing clustered computers and components (e.g., database server computers, application server computers, etc.) that act as a single pool of seamless resources when accessed within environment 100. Server(s) 105 may include components as described in further detail in FIG. 5.

Figure 2A:
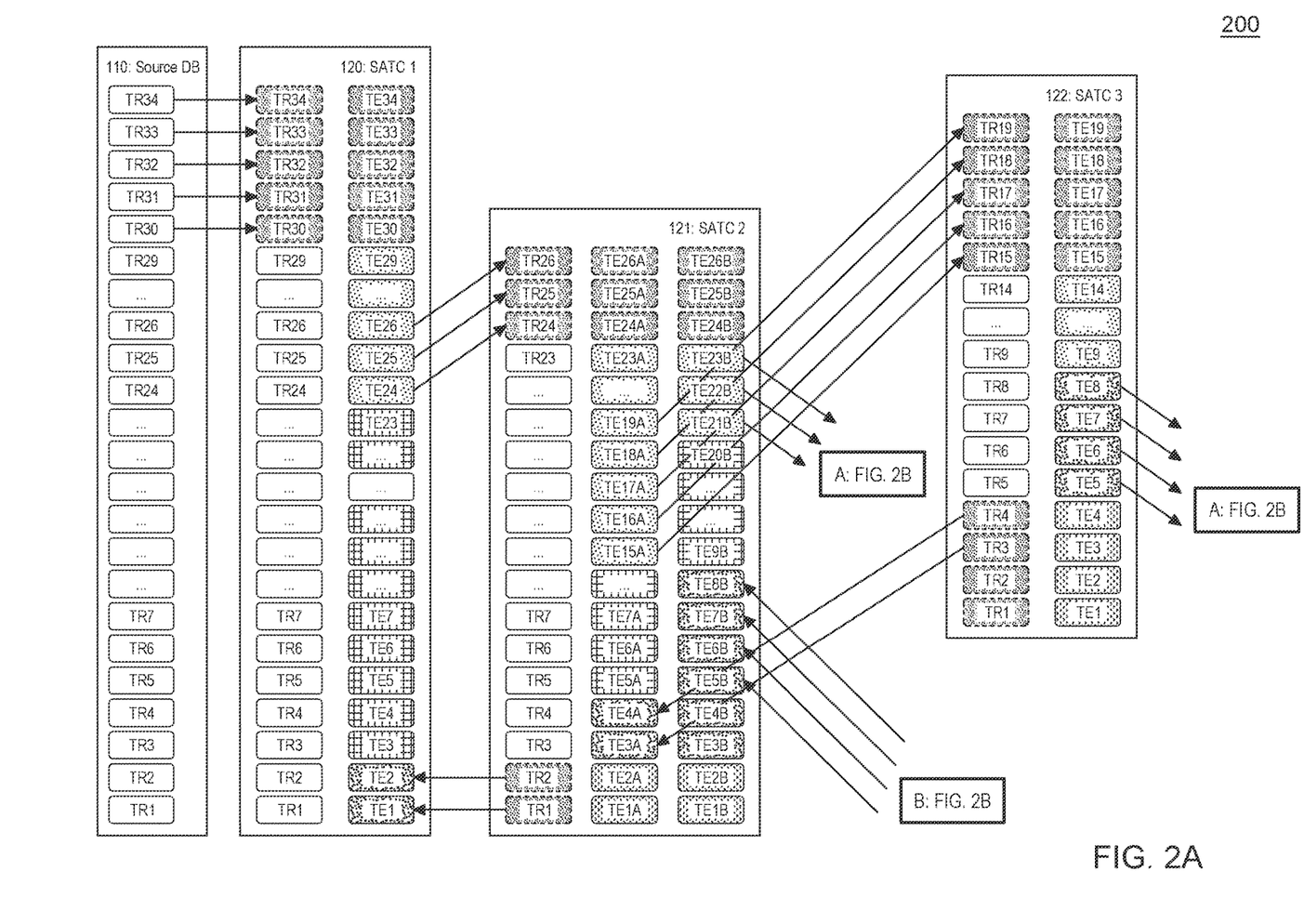
FIGS. 2A and 2B depict a cleanup process diagram for optimizing resources in a disaster recovery cleanup process, in accordance with an embodiment of the present invention.
Figure 2B:
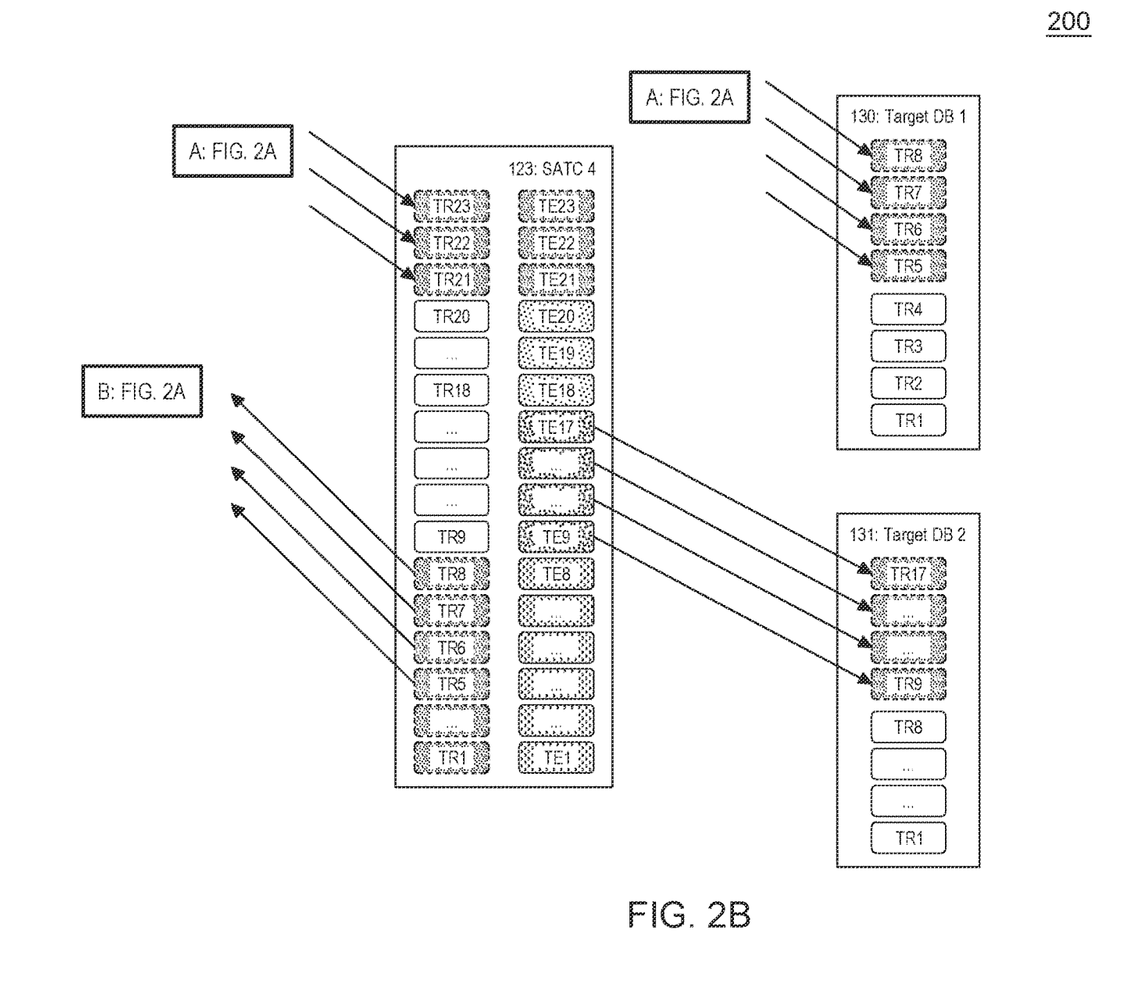

FIGS. 2A and 2B depict cleanup process diagram 200 for optimizing resources in a disaster recovery cleanup process, in accordance with an embodiment of the present invention.

In an embodiment, an initial step of the cleanup process shown in diagram 200 may include part of the replication process as described above herein, wherein one or more processors may be configured for SATC 3 122 to ship a transaction payload (e.g., TR5-TR8) associated with selected Tracking Entries (e.g., TE5-TE8) to Successor System (e.g., Target DB 1 130). Normally, the Tracking Entries would be status marked as "processed", however since the Successor System is directly Target Database, the status of Tracking Entries is directly changed to "completed".

In an embodiment, a cleanup process as described herein may be performed on a periodic basis. For example, the cleanup process may be configured to scan for all Transaction IDs where all associated tracking entries, against all successor systems, are status marked as "completed". For each identified Transaction ID, the associated Transaction Entry is deleted and all associated Tracking Entries, against all successor systems, are status marked as "deleted". Further, predecessor system (e.g., SATC 2 121) may be provided with a list of all Transaction IDs that were deleted or status marked as deleted.

In an embodiment, responsive to successor system (e.g., either SATC 3 122 or SATC 4 123) providing the list of Transaction IDs that were deleted, one or more processors may be configured to status mark all associated Tracking Entries for the given Transaction IDs and given successor system as "completed". Next, the cleanup process as described above herein may be executed again. It should be noted that Transaction IDs TR3-TR4 can be cleaned up because both Tracking Entries TE3A, TE3B and TE4A, TE4B are status marked as "completed". However, transactions TR5-TR8 are still only status marked as "processed", which means they have been sent to Successor System, but no confirmation has been received that they were delivered to each of the Target Systems (e.g., Target DB 1 130, Target DB 2 131). Therefore, transactions TR5-TR8 must be retained until such confirmation is received.

Figure 3A:
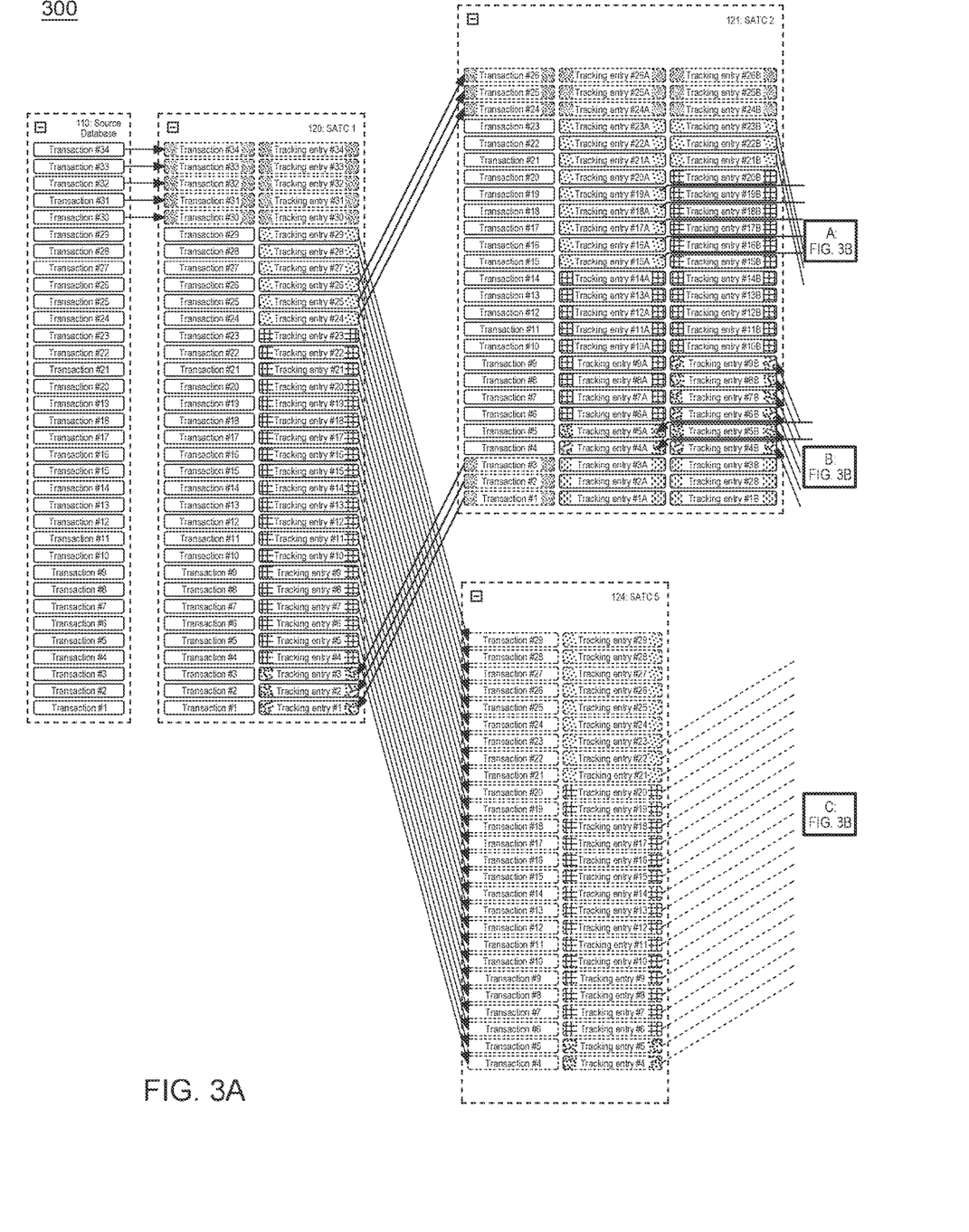
FIGS. 3A and 3B depict a cleanup process after topology change diagram for optimizing resources in a disaster recovery cleanup process, in accordance with an embodiment of the present invention.
Figure 3B:
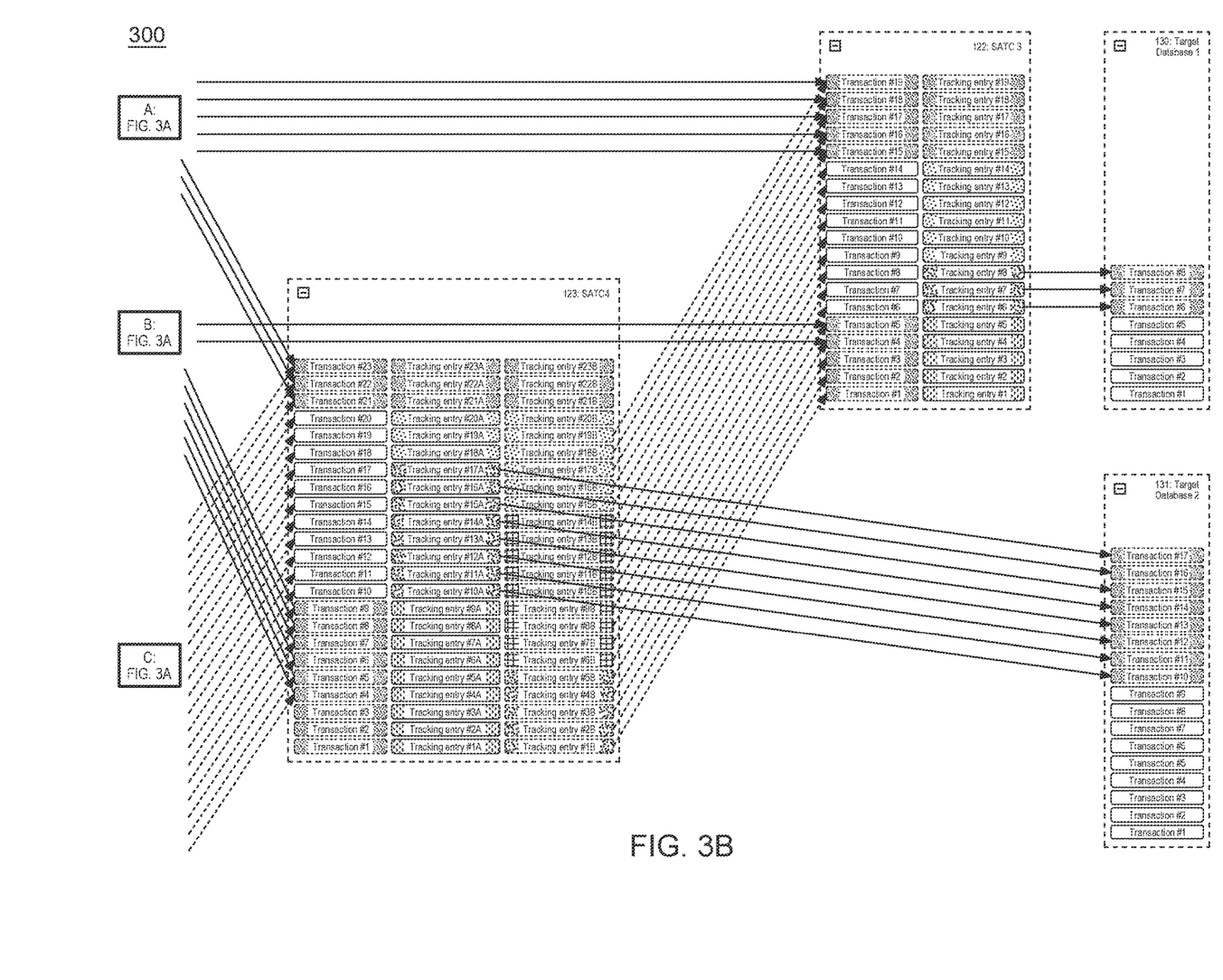

FIGS. 3A and 3B depict cleanup process after topology change diagram 300 for optimizing resources in a disaster recovery cleanup process, in accordance with an embodiment of the present invention.

In an embodiment, after a topology change from a first topology to a second topology, the one or more processors may be configured for creating new Tracking Entries on each impacted SATC for new Successor Systems. Further, each SATC may be configured to query the Successor System to get known statuses of newly created Tracking Entries. For example, referring to FIG. 3B and FIG. 3A, SATC 4 123 may be configured to receive the following Tracking Entry status updates: TE1B-5B: "completed"; TE6B-14B: "processed"; TE15B-20B: "new". It should be noted that TE21B-TE23B are just being created by both SATC 2 121 and SATC 5 124.

In an embodiment, referring to FIG. 3A and FIG. 3B, all Transaction IDs where all associated Tracking Entries (against all successor systems) are status marked as "completed" or "deleted" are listed in the target databases (e.g., Target DB 1 130, Target DB 2 131). For each identified Transaction ID, the associated Transaction Entry is deleted, and all associated Tracking Entries (against all successor systems) are status marked as "deleted" (i.e., TR1-TR5). As a result, to keep the system consistent, the one or more processors may be configured to deliver TR6-TR9 from the Predecessor System because no confirmation has been received that TR6-TR9 was delivered to each of the target databases.

In an embodiment, the one or more processors may be configured for performing an adjustment of the replication process. The replication process may benefit from an adjustment because SATC 5 124 will not receive an update from SATC 4 123 until the status on the Successor System is properly determined using the methods described above herein. Further, the Successor System may receive information to set the status of newly created Tracking Entries. For example, SATC 5 124 may receive the following Tracking Entry updates: TE4-TE5: "completed"; TE6-TE20: "processed"; TE21-TE29: "new". It should be noted that TE1-TE3 were not created because the Predecessor System (e.g., SATC 1 120) already communicated status "completed".

In an embodiment, all Transaction IDs where all associated Tracking Entries (against all successor systems) are status marked as "completed" or "deleted" may be listed in the target databases (e.g., Target DB 1 130, Target DB 2 131). For each identified Transaction ID, the associated Transaction Entry is deleted, and all associated Tracking Entries (against all successor systems) are status marked as "deleted" (i.e., TR4-TR5). As a result, to keep the system consistent, the one or more processors may be configured to deliver TR6-TR29 from the Predecessor System because no confirmation has been received that TR6-TR29 were delivered to each of the target databases.

Figure 4:
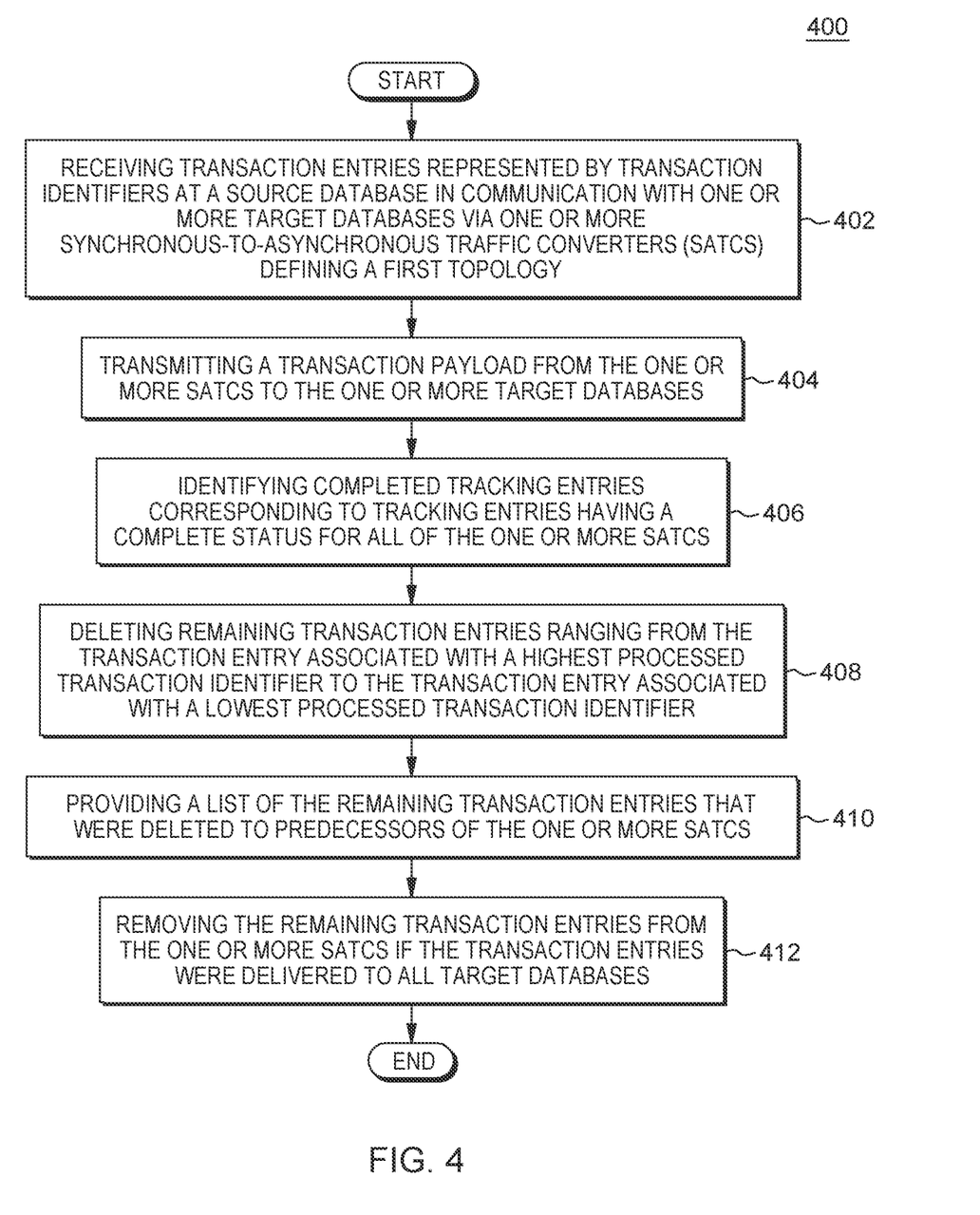
FIG. 4 depicts a flow chart of a computer-implemented method for optimizing resources in a disaster recovery cleanup process, in accordance with an embodiment of the present invention.

FIG. 4 depicts a flow chart of a computer-implemented method 400 for optimizing resources in a disaster recovery cleanup process, in accordance with an embodiment of the present invention.

In an embodiment, computer-implemented method 400 may include one or more processors configured for receiving 402 transaction entries represented by transaction identifiers at a source database in communication with one or more target databases via one or more Synchronous-to-Asynchronous Traffic Converters (SATCs) defining a first topology. For example, source database 110 may be configured to receive data corresponding to transaction entries indicated as transaction identifiers (e.g., TR1-TR34).

Further, computer-implemented method 400 may include one or more processors configured for shipping or transmitting 404 a transaction payload (e.g., TE8-TE5) from the one or more SATCs (e.g., SATC 3 122) to the one or more target databases (e.g., Target database 1 130).

In an embodiment, the computer-implemented method 400 may further include one or more processors configured for generating a tracking entry (e.g., TE1-TE34) having a status identifier (e.g., "completed", "processed", "new", "deleted", "additional steps") for each of the one or more transaction entries. Further, the one or more processors may be configured for marking the status identifier for each tracking entry associated with the remaining transaction entries that were deleted as a deleted status.

In an embodiment, the transaction payload may be associated with a first set of tracking entries (e.g., TE8-TE5) selected to be processed based on a first set of Quality of Service (QoS) parameters.

In an embodiment, the computer-implemented method 400 may further include one or more processors configured for replicating the tracking entry in the one or more SATCs when the one or more SATCs has more than one successor SATCs. For example, referring to FIG. 2A, more than one successor systems are in communication with SATC 2 121, thus resulting in the replication of tracking entries associated (e.g., TE1A-TE26A and TE1B-TE26B) with transaction entries (e.g., TR1-TR26) shown in SATC 2 121. Replicating tracking entries allows tracking entries to be provisioned for more than one component in a successor network.

In an embodiment, the computer-implemented method 400 may further include one or more processors configured for identifying 406 completed tracking entries corresponding to tracking entries having a complete status for each of the one or more SATCs. In other words, each component in environment 100 may be queried or scanned by another component in environment 100 to determine the status of each tracking entry in the respective component. For example, SATC 1 120 may query SATC 2 121 to determine the status of TR1 and TR2 as corresponding to a "complete" status and update the status of TE1 and TE2 accordingly.

In an embodiment, the computer-implemented method 400 may further include one or more processors configured for deleting 408 remaining transaction entries ranging from the transaction entry associated with a highest processed transaction ID to the transaction entry associated with a lowest processed transaction ID. For example, referring to FIG. 2B, the cleanup process scans for all transaction IDs against all successor systems that are status marked as "completed" (e.g., TE8-TE5 of SATC 3 122). For each identified transaction ID, the associated transaction entry is deleted, and all associated Tracking Entries (against all successor systems) are status marked as "deleted" (e.g., TE4-TE1 of SATC 3 122). Then, the predecessor system (e.g., SATC 2 121) is provided with a list of transaction IDs that were deleted.

In an embodiment, the computer-implemented method 400 may further include one or more processors configured for providing 410 a list of the remaining transaction entries from the one or more SATCs if the transaction entries were delivered to each of the target databases.

Further, computer-implemented method 400 may include one or more processors configured for identifying a first consistency transaction entry (e.g., TR8-TR5 in Target DB 1 130) as one or more of the remaining transaction entries that were not delivered to each of the one or more target databases and delivering the first consistency transaction entry to a first target database deficient of the first consistency transaction entry. For example, referring to FIGS. 2A and 2B, transaction identifiers TR8-TR5 in Target DB 2 131 are identified as not being delivered to Target DB 1 130 because the highest processed transaction ID in Target DB 1 130 is TR4. Therefore, transaction identifiers TR8-TR5 may need to be redelivered to Target DB 1 130 to ensure no data loss during the disaster recovery plan and to keep the system consistent.

In an embodiment, the computer-implemented method 400 may further include one or more processors configured for detecting a topology change corresponding to one or more additional SATCs integrated with the one or more SATCs defining a second topology.

Further, computer-implemented method 400 may include one or more processors configured for generating new tracking entries having new status identifiers for each of the one or more transaction entries affected by the topology change in the second topology.

Further, computer-implemented method 400 may include one or more processors configured for identifying second consistency transaction entries as one or more of the new tracking entries that were not delivered to each the one or more target databases. For example, referring to FIGS. 3A and 3B, transaction identifiers TR9-TR6 in Target DB 2 131 are identified as not being delivered to Target DB 1 130 because the highest processed transaction ID in Target DB 1 130 is TR5. Therefore, transaction identifiers TR9-TR6 may need to be redelivered to Target DB 1 130 to ensure no data loss during the disaster recovery plan and to keep the system consistent.

Further, computer-implemented method 400 may include one or more processors configured for delivering the second consistent transaction entries to a second target database deficient of the second consistency transaction entries. For example, the second consistent transaction entries (e.g., TR9-TR6 in FIGS. 3A and 3B) may be delivered to a second target database (e.g., Target DB 1 130) deficient of TR9-TR6.

In an embodiment, the computer-implemented method 400 may further include one or more processors configured for removing 412 the remaining transaction entries from the one or more SATCs if the transaction entries were delivered to all target databases.

Figure 5:
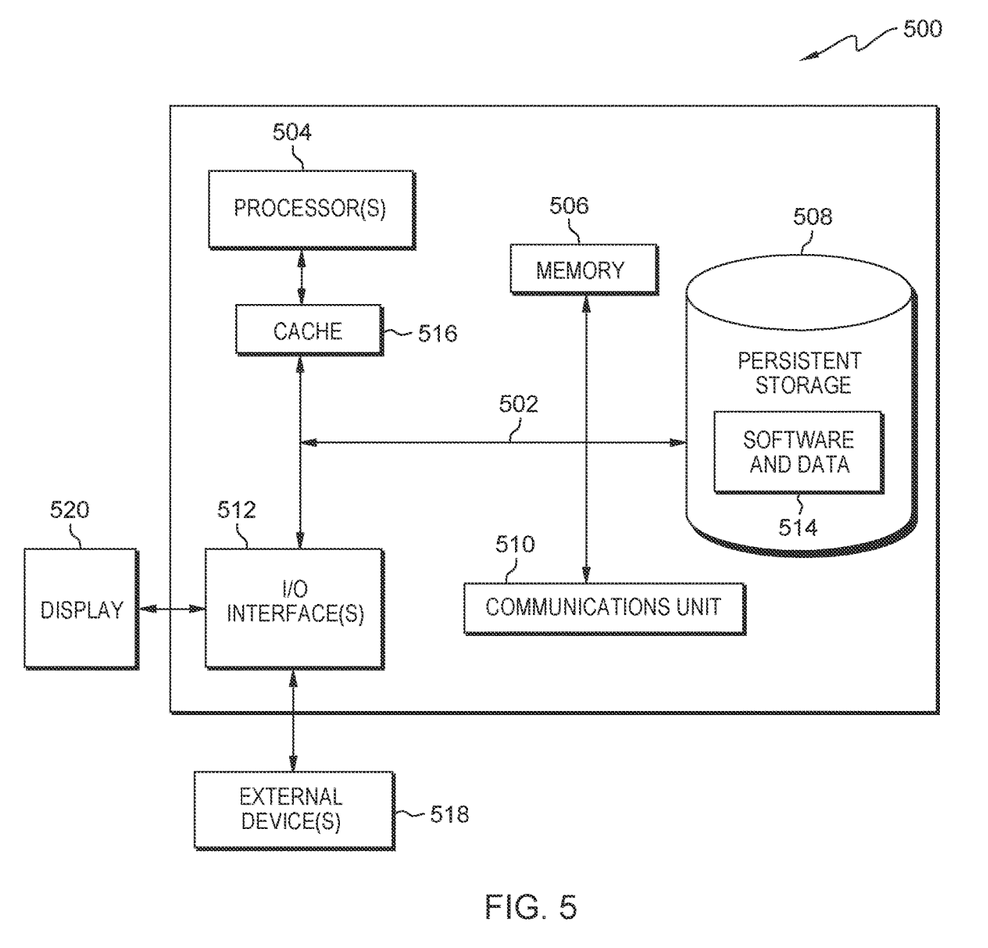
FIG. 5 depicts a block diagram of a server of the component interaction environment of FIG. 1, in accordance with an embodiment of the present invention.

FIG. 5 depicts a block diagram of server 500, suitable for server 105 within component interaction environment 100 of FIG. 1, in accordance with an embodiment of the present invention.

Server 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Software and data 514 may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Software and data 514 may be downloaded to persistent storage 508 through communications unit 510.

I/O interface(s) 512 allows for input and output of data with other devices that may be connected to server 105. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data 514 used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The present invention may contain various accessible data sources, such as database (e.g., source database 110, target database 130 and target database 131), that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Software and data 514 may enable the authorized and secure processing of personal data. Software and data 514 may be configured to provide informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Software and data 514 may provide information regarding personal data and the nature (e.g., type, scope, purpose, duration, etc.) of the processing. Software and data 514 provide the user with copies of stored personal data. Software and data 514 allow the correction or completion of incorrect or incomplete personal data. Software and data 514 allow the immediate deletion of personal data.

The present invention may be a system, a computer-implemented method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of computer-implemented methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, transaction entries represented by transaction identifiers at a source database in communication with one or more target databases via one or more Synchronous-to-Asynchronous Traffic Converters (SATCs) defining a first topology;
   transmitting, by the one or more processors, a transaction payload from the one or more SATCs to the one or more target databases;
   identifying, by the one or more processors, completed tracking entries corresponding to tracking entries having a complete status for the one or more SATCs;
   deleting, by the one or more processors, remaining transaction entries ranging from a transaction entry associated with a highest processed transaction identifier to a transaction entry associated with a lowest processed transaction identifier; and
   removing, by the one or more processors, the remaining transaction entries from the one or more SATCs subsequent to the transaction entries being delivered to each of the one or more target databases.

2. The computer-implemented method of claim 1, wherein the transaction payload is associated with a first set of tracking entries selected to be processed based on a first set of Quality of Service (QoS) parameters.

3. The computer-implemented method of claim 1, further comprising:
   generating, by the one or more processors, a tracking entry having a status identifier for each of the one or more transaction entries; and
   marking, by the one or more processors, the status identifier for each tracking entry associated with the remaining transaction entries that were deleted as a deleted status.

4. The computer-implemented method of claim 3, further comprising:
   replicating, by the one or more processors, the tracking entry in the one or more SATCs when the one or more SATCs has more than one successor SATCs.

5. The computer-implemented method of claim 1, further comprising:
identifying, by the one or more processors, a first consistency transaction entry as one or more of the remaining transaction entries that were not delivered to the one or more target databases; and
delivering, by the one or more processors, the first consistency transaction entry to a first target database deficient of the first consistency transaction entry.

6. The computer-implemented method of claim 1, further comprising:
detecting, by the one or more processors, a topology change corresponding to one or more additional SATCs integrated with the one or more SATCs defining a second topology.

7. The computer-implemented method of claim 6, further comprising:
generating, by the one or more processors, new tracking entries having new status identifiers for each of the one or more transaction entries affected by the topology change in the second topology;
querying, by the one or more processors, successor SATCs to identify a status based on a status identifier of the new tracking entries;
identifying, by the one or more processors, second consistency transaction entries as one or more of the new tracking entries that were not delivered to each of the one or more target databases; and
delivering, by the one or more processors, the second consistency transaction entries to a second target database deficient of the second consistency transaction entries.

8. A computer program product comprising:
one or more computer readable storage media and program instructions collectively stored on the one or more computer readable storage media, the program instructions comprising:
program instructions to receive transaction entries represented by transaction identifiers at a source database in communication with one or more target databases via one or more Synchronous-to-Asynchronous Traffic Converters (SATCs) defining a first topology;
program instructions to transmit a transaction payload from the one or more SATCs to the one or more target databases;
program instructions to identify completed tracking entries corresponding to tracking entries having a complete status for the one or more SATCs;
program instructions to delete remaining transaction entries ranging from a transaction entry associated with a highest processed transaction identifier to a transaction entry associated with a lowest processed transaction identifier; and
program instructions to remove the remaining transaction entries from the one or more SATCs subsequent to the transaction entries being delivered to each of the one or more target databases.

9. The computer program product of claim 8, wherein the transaction payload is associated with a first set of tracking entries selected to be processed based on a first set of Quality of Service (QoS) parameters.

10. The computer program product of claim 8, further comprising:
program instructions to generate a tracking entry having a status identifier for each of the one or more transaction entries; and
program instructions to mark the status identifier for each tracking entry associated with the remaining transaction entries that were deleted as a deleted status.

11. The computer program product of claim 10, further comprising:
program instructions to replicate the tracking entry in the one or more SATCs when the one or more SATCs has more than one successor SATCs.

12. The computer program product of claim 8, further comprising:
program instructions to identify a first consistency transaction entry as one or more of the remaining transaction entries that were not delivered to the one or more target databases; and
program instructions to deliver the first consistency transaction entry to a first target database deficient of the first consistency transaction entry.

13. The computer program product of claim 8, further comprising:
program instructions to detect a topology change corresponding to one or more additional SATCs integrated with the one or more SATCs defining a second topology.

14. The computer program product of claim 13, further comprising:
program instructions to generate new tracking entries having new status identifiers for each of the transaction entries affected by the topology change in the second topology;
program instructions to query successor SATCs to identify a status based on a status identifier of the new tracking entries;
program instructions to identify second consistency transaction entries as one or more of the one or more transaction entries that were not delivered to the one or more target databases; and
program instructions to deliver the second consistency transaction entries to a second target database deficient of the second consistency transaction entries.

15. A computer system comprising:
one or more computer processors;
one or more computer readable storage media; and
program instructions stored on the one or more computer readable storage media for execution by at least one of the one or more processors, the program instructions comprising:
program instructions to receive transaction entries represented by transaction identifiers at a source database in communication with one or more target databases via one or more Synchronous-to-Asynchronous Traffic Converters (SATCs) defining a first topology;
program instructions to transmit a transaction payload from the one or more SATCs to the one or more target databases;
program instructions to identify completed tracking entries corresponding to tracking entries having a complete status for the one or more SATCs;
program instructions to delete remaining transaction entries ranging from the transaction entry associated with a highest processed transaction identifier to the transaction entry associated with a lowest processed transaction identifier; and
program instructions to remove the remaining transaction entries from the one or more SATCs subsequent to the transaction entries being delivered to each of the one or more target databases.

16. The computer system of claim 15, wherein the transaction payload is associated with a first set of tracking entries selected to be processed based on a first set of Quality of Service (QoS) parameters.

17. The computer system of claim 15, wherein further comprising:
program instructions to generate a tracking entry having a status identifier for each of the one or more transaction entries;
program instructions to mark the status identifier for each tracking entry associated with the remaining transaction entries that were deleted as a deleted status; and
program instructions to replicate the tracking entry in the one or more SATCs when the one or more SATCs has more than one successor SATCs.

18. The computer system of claim 15, further comprising:
program instructions to identify a first consistency transaction entry as one or more of the remaining transaction entries that were not delivered to the one or more target databases; and
program instructions to deliver the first consistency transaction entry to a first target database deficient of the first consistency transaction entry.

19. The computer system of claim 15, further comprising:
program instructions to detect a topology change corresponding to one or more additional SATCs integrated with the one or more SATCs defining a second topology.

20. The computer system of claim 19, further comprising:
program instructions to generate new tracking entries having new status identifiers for each of the transaction entries affected by the topology change in the second topology;
program instructions to query successor SATCs to identify a status based on a status identifier of the new tracking entries;
program instructions to identify second consistency transaction entries as one or more of the one or more transaction entries that were not delivered to the one or more target databases; and
program instructions to deliver the second consistency transaction entries to a second target database deficient of the second consistency transaction entries.

* * * * *